US011100290B2

(12) United States Patent
Boada et al.

(10) Patent No.: US 11,100,290 B2
(45) Date of Patent: Aug. 24, 2021

(54) UPDATING AND MODIFYING LINGUISTIC BASED FUNCTIONS IN A SPECIALIZED USER INTERFACE

(71) Applicant: INTERNATIONAL BUSINESS MACHINES CORPORATION, Armonk, NY (US)

(72) Inventors: Jason Boada, Danbury, CT (US); Qin Shirley Held, Midland Park, NJ (US); Rachel Cohen, Brooklyn, NY (US); Munish Goyal, Yorktown Heights, NY (US); Dangaia Sims, Yonkers, NY (US)

(73) Assignee: International Business Machines Corporation, Armonk, NY (US)

( * ) Notice: Subject to any disclaimer, the term of this patent is extended or adjusted under 35 U.S.C. 154(b) by 185 days.

(21) Appl. No.: 16/426,113

(22) Filed: May 30, 2019

(65) Prior Publication Data
US 2020/0380075 A1    Dec. 3, 2020

(51) Int. Cl.
*G06F 40/30*    (2020.01)
*G06K 9/62*     (2006.01)
(Continued)

(52) U.S. Cl.
CPC ............ *G06F 40/30* (2020.01); *G06F 40/253* (2020.01); *G06K 9/6215* (2013.01); *G06N 5/04* (2013.01); *G06N 20/00* (2019.01)

(58) Field of Classification Search
CPC ........ G06F 40/30; G06F 40/253; G06F 40/16; G06F 40/216; G06F 40/247; G06F 40/166; G06K 9/6215; G06N 5/04; G06N 20/00
See application file for complete search history.

(56) References Cited

U.S. PATENT DOCUMENTS 7,107,518 B2    9/2006  Ramaley
7,818,678 B2   10/2010  Massand
(Continued)

OTHER PUBLICATIONS

Balakrishna, Sowmya Vajjala; Analyzing Text Complexity and Text Simplification: Connecting Linguistics, Processing and Educational Applications; Dissertation submitted in fulfillment of the requirements for the degree of doctor of Faculty of Philosophy at Eberhard Karls University of Tubingen; 2015; 300 pages.
(Continued)

*Primary Examiner* — Michael N Opsasnick
(74) *Attorney, Agent, or Firm* — Schmsier, Olsen & Watts; Stephanie Carusillo (57) ABSTRACT

A method and system for improving linguistic data and storage technology is provided. The method includes receiving data input text from a user and identifying text within the data input text. The data input text is edited and improvements in the data input text are detected via a machine learning process. In response, a modified version of the user interface is generated for allowing additional users to view and modify additional data input text. Change attributes associated with the data input text with respect to the modified version of the user interface are determined and alternative input suggestions are ranked. Editing data and code are generated in response to an editor engine interacting with a hardware controller. The editing data and code is executed thereby updating and modifying functions associated with software engines to increase an efficiency of future recommendations associated with future data input text analysis.

20 Claims, 7 Drawing Sheets

(51) Int. Cl.
  *G06N 5/04* (2006.01)
  *G06N 20/00* (2019.01)
  *G06F 40/253* (2020.01)

(56) References Cited

U.S. PATENT DOCUMENTS

| | | | |
|---|---|---|---|
| 8,131,756 B2 * | 3/2012 | Carus | G06F 16/36 |
| | | | 707/776 |
| 8,165,974 B2 | 4/2012 | Privault | |
| 9,502,031 B2 * | 11/2016 | Paulik | G10L 15/22 |
| 9,916,306 B2 | 3/2018 | Van Den Oever | |
| 2007/0220479 A1 | 9/2007 | Hughes | |
| 2008/0134298 A1 | 6/2008 | Nathan | |
| 2009/0094086 A1 | 4/2009 | Bruno | |
| 2009/0106239 A1 | 4/2009 | Getner | |
| 2010/0293451 A1 * | 11/2010 | Carus | G06F 16/36 |
| | | | 715/230 |
| 2010/0332217 A1 | 12/2010 | Wintner | |
| 2012/0284344 A1 | 11/2012 | Costenaro | |
| 2012/0324369 A1 | 12/2012 | Safa | |
| 2013/0151238 A1 * | 6/2013 | Beaurpere | G06F 40/242 |
| | | | 704/9 |
| 2014/0207439 A1 * | 7/2014 | Venkatapathy | G06F 40/274 |
| | | | 704/4 |
| 2015/0058282 A1 | 2/2015 | Saraya | |
| 2017/0220536 A1 | 8/2017 | Chiba | |
| 2017/0236407 A1 * | 8/2017 | Rhoads | H04N 5/23219 |
| | | | 455/420 |
| 2018/0060302 A1 * | 3/2018 | Liang | G06F 40/289 |
| 2018/0102062 A1 | 4/2018 | Livni | |
| 2018/0173698 A1 * | 6/2018 | Dubey | G06F 40/30 |
| 2018/0267950 A1 | 9/2018 | De Mello Brandao | |
| 2018/0330000 A1 * | 11/2018 | Noble | G09B 7/02 |
| 2019/0005049 A1 * | 1/2019 | Mittal | G06F 16/316 |
| 2019/0050389 A1 | 2/2019 | Kinder | |
| 2020/0005118 A1 * | 1/2020 | Chen | G06N 3/006 |
| 2020/0007380 A1 * | 1/2020 | Chen | H04L 41/046 |
| 2020/0160458 A1 | 5/2020 | Bodin | |

OTHER PUBLICATIONS

Friedman, Mark J.; List of IBM Patents or Patent Applications Treated as Related; May 30, 2019; 1 page.

* cited by examiner

UPDATING AND MODIFYING LINGUISTIC BASED FUNCTIONS IN A SPECIALIZED USER INTERFACE

This invention was made with government support under contract number GS00Q09BGD0034 awarded by U.S. General Services Administration. The government has certain rights to this invention.

FIELD

The present invention relates generally to a method for reorganizing domain-specific linguistic data and in particular to a method and associated system for improving user interface technology associated with editing and modifying a specialized user interface and executing editing code for updating and modifying functions associated with software engines for increasing an efficiency of future recommendations associated with future data input text analysis.

BACKGROUND

Typical data simplification systems allow for little flexibility with respect automated functionality. Manual systems may implement a complicated process that may be time consuming and require a large amount of resources. Additionally, detecting simplification code for efficient software execution may require technically advanced equipment for enabling automated functionality.

SUMMARY

A first aspect of the invention provides a machine learning domain-specific linguistic data and memory reorganization method comprising: receiving, by a user interface via a processor of a hardware controller, data input text from a user; identifying, by the processor executing a readability engine of the hardware controller, words, phrases, and sentences within the data input text, wherein the words, phrases, and sentences are associated with linguistic attributes not included within common readability metrics; editing, by the processor via the user interface, the data input text based on user input; detecting in response to the editing, by the processor executing a machine learning engine of the hardware controller, improvements in the data input text; generating, by the processor in response to the detecting, a modified version of the user interface such that the modified version of the user interface is configured to allow additional users to view and modify additional data input text, view suggestions from the readability engine, and input domain-specific terms to a database; determining, by the processor executing a context score engine of the hardware controller, change attributes associated with the data input text with respect to the modified version of the user interface and detected data input changes from the data input text; ranking, by the processor executing a ranking engine of the hardware controller, alternative input suggestions associated with the detected data input changes transmitted to the user interface for analysis; generating, by the processor, editing data and code in response to an editor engine interacting with the hardware controller; and executing, by the processor, the editing data and code thereby updating and modifying functions associated with the readability engine, the context score engine, and the ranking engine for increasing an efficiency of future recommendations associated with future data input text analysis.

A second aspect of the invention provides a computer program product, comprising a computer readable hardware storage device storing a computer readable program code, the computer readable program code comprising an algorithm that when executed by a processor of a hardware controller implements a machine learning domain-specific linguistic data and memory reorganization method, the method comprising: receiving, by a user interface via the processor, data input text from a user; identifying, by the processor executing a readability engine of the hardware controller, words, phrases, and sentences within the data input text, wherein the words, phrases, and sentences are associated with linguistic attributes not included within common readability metrics; editing, by the processor via the user interface, the data input text based on user input; detecting in response to the editing, by the processor executing a machine learning engine of the hardware controller, improvements in the data input text; generating, by the processor in response to the detecting, a modified version of the user interface such that the modified version of the user interface is configured to allow additional users to view and modify additional data input text, view suggestions from the readability engine, and input domain-specific terms to a database; determining, by the processor executing a context score engine of the hardware controller, change attributes associated with the data input text with respect to the modified version of the user interface and detected data input changes from the data input text; ranking, by the processor executing a ranking engine of the hardware controller, alternative input suggestions associated with the detected data input changes transmitted to the user interface for analysis; generating, by the processor, editing data and code in response to an editor engine interacting with the hardware controller; and executing, by the processor, the editing data and code thereby updating and modifying functions associated with the readability engine, the context score engine, and the ranking engine for increasing an efficiency of future recommendations associated with future data input text analysis.

A third aspect of the invention provides a hardware controller comprising a processor coupled to a computer-readable memory unit, the memory unit comprising instructions that when executed by the computer processor implements a machine learning domain-specific linguistic data and memory reorganization method comprising: receiving, by a user interface via the processor, data input text from a user; identifying, by the processor executing a readability engine of the hardware controller, words, phrases, and sentences within the data input text, wherein the words, phrases, and sentences are associated with linguistic attributes not included within common readability metrics; editing, by the processor via the user interface, the data input text based on user input; detecting in response to the editing, by the processor executing a machine learning engine of the hardware controller, improvements in the data input text; generating, by the processor in response to the detecting, a modified version of the user interface such that the modified version of the user interface is configured to allow additional users to view and modify additional data input text, view suggestions from the readability engine, and input domain-specific terms to a database; determining, by the processor executing a context score engine of the hardware controller, change attributes associated with the data input text with respect to the modified version of the user interface and detected data input changes from the data input text; ranking, by the processor executing a ranking engine of the hardware controller, alternative input suggestions associated with the detected data input changes transmitted to the user interface for analysis; generating, by the processor, editing data and code in response to an editor engine interacting with the hardware controller; and executing, by the processor, the editing data and code thereby updating and modifying functions associated with the readability engine, the context score engine, and the ranking engine for increasing an efficiency of future recommendations associated with future data input text analysis.

The present invention advantageously provides a simple method and associated system capable of implementing data simplification systems for efficient software execution.

DETAILED DESCRIPTION

Figure 1:
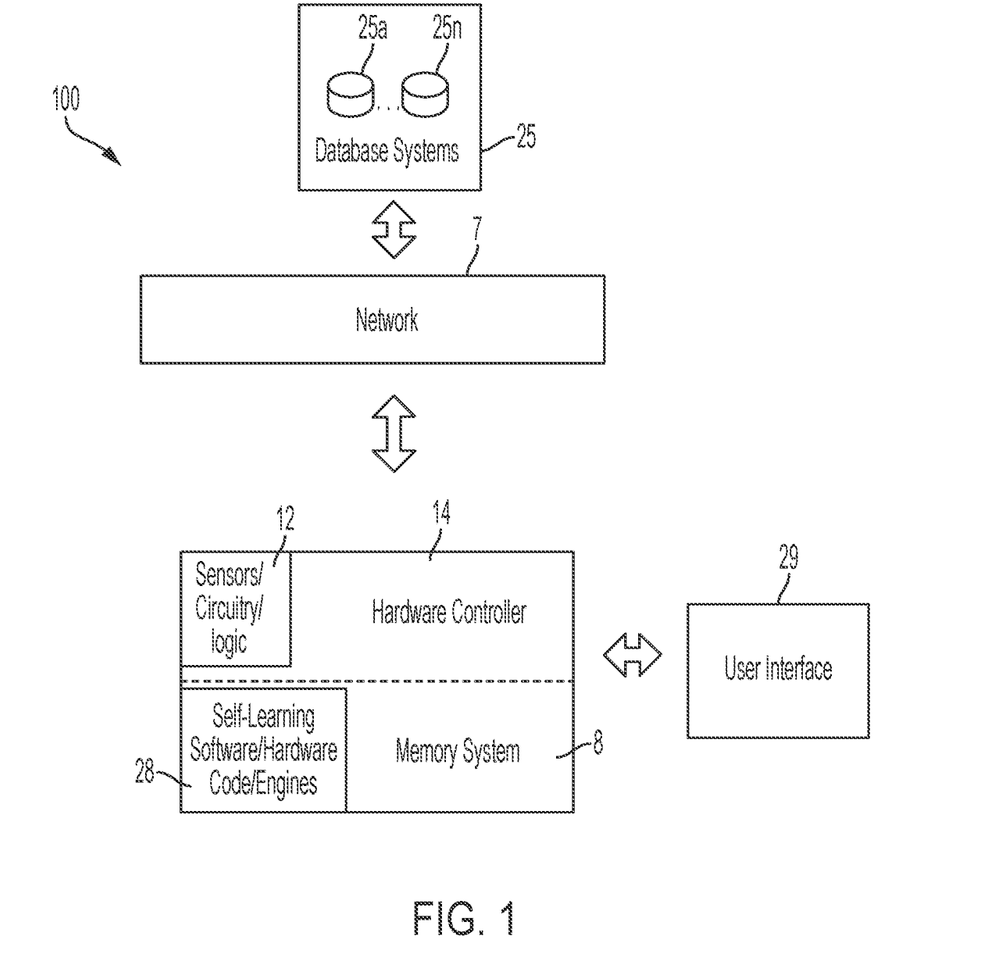
FIG. 1 illustrates a system for improving user interface technology associated with editing and modifying a specialized user interface and executing editing code for updating and modifying functions associated with software engines for increasing an efficiency of future recommendations associated with future data input text analysis processes, in accordance with embodiments of the present invention.

FIG. 1 illustrates a system 100 for improving user interface technology associated with editing and modifying a specialized user interface and executing editing code for updating and modifying functions associated with software engines for increasing an efficiency of future recommendations associated with future data input text analysis processes, in accordance with embodiments of the present invention. Typical text simplification processes include techniques designed to allow natural language text to become more readable or understandable while preserving a semantic content of the text. Similar to many natural language processing tasks, a text simplification task may include a complicated task. A major factor leading to a lack of automated text simplification tools includes a gap between existing natural language processing techniques and required grammatical and stylistic standards of the text associated with modified by machine learning technology that must be edited and/or corrected by users. Additional challenges associated with implementing automated text simplification tools may include locating a balance between generality (i.e., arising from learning broad features of language from a large corpora of text) and specificity (i.e., adjusting to domain-specific vocabulary and grammar). With respect to domain-specific settings, there may be exceptions to general standards of vocabulary, grammar, and style learned from text and it may be a difficult task to determine when to execute these exceptions. Therefore, system 100 enables a cognitive (software/hardware) engine that identifies aspects of text that are difficult to understand and provides suggestions for improving a readability of the text. Readability of text is defined herein as a linguistic sense determined based on several standard metrics (e.g., Dale-Chall, Gunning-Fog, Flesch-Kincaid, etc.). The aforementioned metrics take into consideration several linguistic features (e.g., average word length in syllables, average sentence length in words, use of uncommon words, etc.) to assign a numeric score reflecting a readability of a document. Specific aspects of text modified via system 100 include text detected by linguistic research tools to contribute to difficulty of understanding as measured by established readability metrics code including the use of words that are difficult to understand and the use (or misuse) of complicated syntactic or grammatical structures. Furthermore, system 100 includes a suggestion engine analyzes for allowing user interactions to be associated with recommendations from the suggestion engine to determine a quality of recommendations and modify the recommendations over time to adjust software and hardware to domain-specific needs. Improving readability via execution of system 100 is enabled based on established readability metrics and improvements of user interactions with hardware and software of system 100. Likewise, generated recommendations continue to improve and adapt (via generation of self-learning code) to domain-specific needs as users interact with system 100.

System 100 is enabled to execute a process for identifying words, phrases, and sentences within text data that contribute to a higher readability score (e.g., indicating a higher difficulty of understanding) as well as additional other linguistic features not included within readability metrics but provide a challenge to a readability of the text data. System 100 generates recommendations for simplifying features (e.g., within software code) identified as difficult to understand. A recommendation engine (within system 100) is developed based on a novel machine learning algorithm/code. The recommendation engine auto-adjusts to user activity to provide increasingly relevant suggestions thereby enabling domain-specific suggestions to conform to individual users or organizational needs. For example, with respect to certain contexts it may be appropriate to replace a term "justification" with a term "reason" in a sentence as the term "reason" is shorter and is a more common word than the term "justification". This replacement process would improve the readability of a sentence. However, there may additionally be scenarios in which the term "justification" comprises a specific, technical definition thereby causing a replacement with the term "reason" to be incorrect. System 100 enables a process for auto-adjusting to user behaviors with respect to the aforementioned replacement scenarios to provide a most appropriate suggestion. Furthermore, system 100 allows for users to specify lists of domain-specific words or phrases to be excluded from the recommendation engine (e.g., technical terms, legal terms, or jargon that must be preserved).

System 100 enables a process for identifying words, phrases, and sentences within text that contribute to a higher readability score (e.g., indicating higher difficulty of understanding). Likewise, system 100 is configured to identify additional linguistic features that are not commonly included within readability metrics but additionally provide a challenge to readability (e.g. the use of a passive voice). The identification process uses corpora (machine learning) methods and existing grammatical (rule based) methods. The corpora methods (executed via self-learning software code) are used to learn the frequency of words in within a target corpora. Additionally, corpora methods may be configured to identify average word and sentence length within the target corpora and use associated guidelines to generate suggestions within the input text. Additional grammatical methods may be used to identify alternative text features such as, inter alia, passive voice or prepositional phrases.

System 100 additionally analyzes the need for domain-specific recommendations thereby allowing a user to identify words or phrases to be excluded from the recommendation engine. Furthermore, system 100 is configured to learn from user activity to provide the relevant and accurate suggestions. A process for collecting user data is executed based on an approval by the user. Such approval also includes a user's option to cancel such collecting, and thus opt/in and opt/out of collecting user data at the user's discretions. Further, any data collected is understood to be intended to be securely stored and unavailable without user authorization.

Software code/engines 28 (of system 100) may be associated with a user interface 29 and may include a readability software/hardware engine and a feedback software/hardware engine. User interface 29 allows a user to view, input, and modify text and additionally displays suggestions provided by the readability engine. The feedback engine analyzes user activity and determines how the readability engine suggestions may be modified to best reconstruct user activity to provide suggestions that are in line with the suggestions accepted by users based on their activity.

System 100 of FIG. 1 includes a hardware controller 14, database systems 25, and a user interface 29 interconnected through a network 7. Hardware controller 14 comprises sensors/circuitry/logic 12 and a (specialized) memory system 8. Memory system 8 comprises software code/engines 28 including executable code. Memory system 8 may include a single memory system. Alternatively, memory system 8 may include a plurality of memory systems. Hardware controller 14, database systems 25, and user interface 29 each may comprise an embedded device(s). An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, hardware controller 14, database systems 25, and user interface 29 may each comprise a specialized hardware device comprising specialized (non-generic) hardware and circuitry (i.e., specialized discrete non-generic analog, digital, and logic-based circuitry) for (independently or in combination) executing a process described with respect to FIGS. 1-7. The specialized discrete non-generic analog, digital, and logic-based circuitry (e.g., sensors/circuitry/ logic 12, etc.) may include proprietary specially designed components (e.g., a specialized integrated circuit, such as for example an Application Specific Integrated Circuit (ASIC) designed for only implementing an automated process for improving user interface technology associated with editing and modifying a specialized user interface and executing editing code for updating and modifying functions associated with software engines for increasing an efficiency of future recommendations associated with future data input text analysis processes. Sensors/circuitry/logic 12 may include any type of internal or external sensors including, inter alia, GPS sensors, Bluetooth beaconing sensors, cellular telephone detection sensors, Wi-Fi positioning detection sensors, triangulation detection sensors, activity tracking sensors, a temperature sensor, an ultrasonic sensor, an optical sensor, a video retrieval device, humidity sensors, voltage sensors, network traffic sensors, etc. Network 7 may include any type of network including, inter alia, a local area network, (LAN), a wide area network (WAN), the Internet, a wireless network, etc.

System 100 enables the following engines/modules for improving user interface technology associated with cognitive optimization of domain-specific text readability:

A feedback engine configured to analyze user activity and determine modifications for readability engine suggestions for reconstructing user activity.

A readability engine configured to identify words, phrases, and sentences within text that contribute to a higher readability score (indicating higher difficulty of understanding). A readability of text may be increased by targeting specific aspects of text that contribute to a difficulty of understanding as measured by established readability metrics and/or detected via specialized sensors.

A user interface for enabling a user to view, input, and modify text and display generated suggestions provided by the readability engine.

A machine learning engine configured to learn from user activity (within the user interface) to improve recommendations from the recommendation engine and leverage a database to store user acceptance data. A modified version of the user interface may be generated such that users may view and modify text, view suggestions from the readability engine, and input domain-specific terms to the database. Additionally, domain-specific recommendations may be generated and leveraged as variables such that the user is provided with visual indications to identify words or phrases to be excluded from the recommendation engine. Likewise, the system may be configured to learn from user activity with the user interface to provide relevant and accurate suggestions.

A context score engine configured to provide a measure of the change with respect to the meaning of a portion of text due to modifications within the original text. The context score engine execute NLP code-based techniques such as, inter alia, measuring similarity of words/phrases using a semantic database, utilizing word embedding methods and computing a similarity of words/phrases using cosine similarity or other vector similarity metrics, etc. An associated output of the context score engine may comprise a composite score for each alternative (e.g., normalized between 0 and 1) word or phrase representing difference in meaning between original text and alternative text.

A ranking engine configured to detect a function of the difficulty score (from the readability engine) with respect to the context score. The ranking engine is configured to assign rankings to each alternative possible and top suggestions are transmitted to the user interface for consideration by editor software. The ranking engine provides prioritization to ranking less difficult alternatives over more difficult alternatives and alternatives with lesser impact to the context score of the original text over alternatives with greater impact. Additionally, the readability engine is configured to generate a complexity score associated with detecting linguistic difficulties such that the aforementioned ranking is generated based on a weighted combination of the difficulty score and the complexity score. Updates to the ranking engine with respect to editor data are reflected within updates to these weights.

Each of the readability engine, context score engine, and ranking engine are defined by functions of input text or difficulty and context scores. The feedback engine utilizes editor actions (e.g., accept, reject, or ignore suggestions provided by the system) to update parameters of the functions in these engines to modify future suggestions and provide more accurate suggestions catered to the needs/priorities of an organization using system 100. The update is executed via usage of gradient methods for incrementally updating parameters based on a step size (determined by the type of editor action) taken on the gradient of the functions with respect to the parameters evaluated at the input.

System 100 is additionally configured to manage separate suggestion engines to learn different readability requirements for different audiences within an organization. For example, documents intended to be used within a legal department may have different readability requirements than legal documents intended for use throughout an organization. Therefore, system 100 is configured to learns differences between these two contexts and generate associated self-learning software code for execution.

Figure 2:
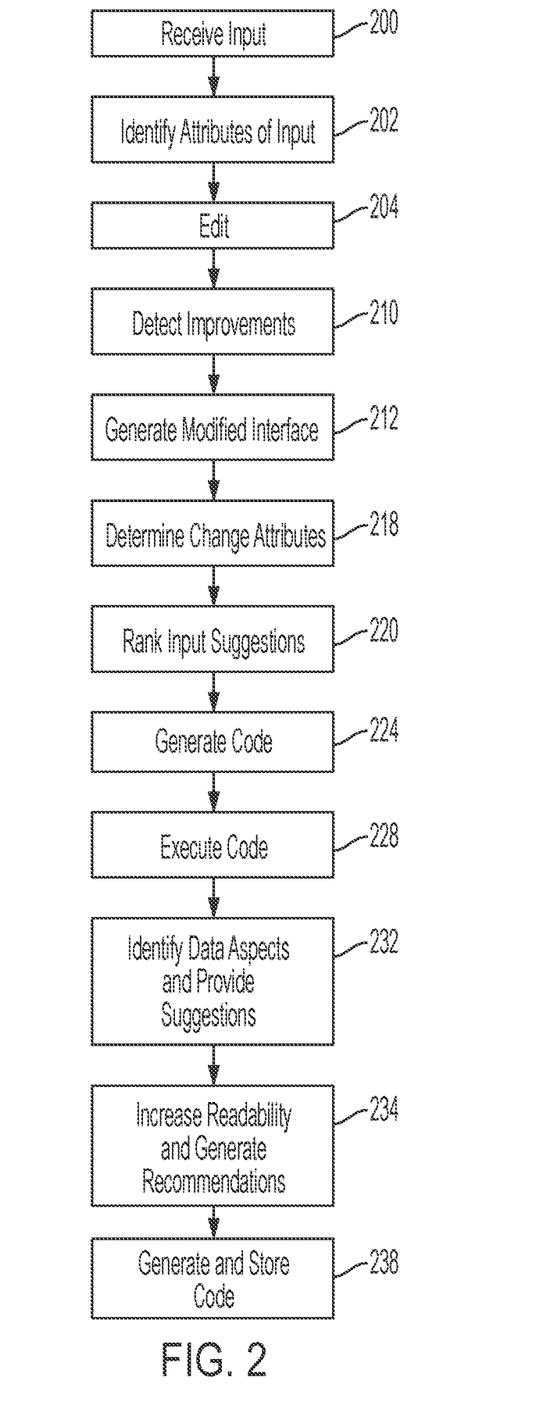
FIG. 2 illustrates an algorithm detailing a process flow enabled by the system of FIG. 1 for improving user interface technology associated with editing and modifying a specialized user interface and executing editing code for updating and modifying functions associated with software engines for increasing an efficiency of future recommendations associated with future data input text analysis processes, in accordance with embodiments of the present invention.

FIG. 2 illustrates an algorithm detailing a process flow enabled by system 100 of FIG. 1 for improving user interface technology associated with editing and modifying a specialized user interface and executing editing code for updating and modifying functions associated with software engines for increasing an efficiency of future recommendations associated with future data input text analysis processes, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by hardware controller 14, database systems 25, and user interface 29. In step 200, data input text is received from a user via a specialized user interface. In step 202, words, phrases, and sentences within the data input text are identified. The words, phrases, and sentences are associated with linguistic attributes not included within common readability metrics. The identification process may include executing machine learning code and existing grammatical rule-based code (with respect to semantic attributes and syntactic attributes) for learning a frequency of words of the data input text within a target corpora; and identifying average word and sentence length (within the target corpora) with respect to a syllable count and word count for executing suggestions with respect to the data input text.

In step 204, the data input text is edited (via the user interface) based on user input. In step 210, improvements in the data input text are detected in response to the editing. In step 212, a modified version of the user interface is generated such that the modified version of the user interface is configured to allow additional users to view and modify additional data input text, view suggestions from a readability engine, and input domain-specific terms to a database. The domain-specific terms may be leveraged as variables such that the user is provided with visual graphical indications to identify words and phrases to be excluded from the user interface. Likewise, the hardware controller may be configured to generate self-learning software code associated with user activity with respect to the user interface for generating relevant and accurate suggestions for generating the self-learning software code.

In step 218, change attributes associated with the data input text are determined with respect to the modified version of the user interface and detected data input changes from the data input text. Determining the change attributes may include: executing NLP code for measuring similarity attributes of words and phrases of the data input text with respect to data of a semantic database; and generating (based on results of executing the NLP code) a composite score associated with the detected data input changes from the data input text. Alternatively, determining the change attributes may include: executing word embedding code for computing similarity attributes of words and phrases of the data input text with respect to vector similarity metrics; and generating, (based on results of executing the word embedding code) a composite score associated with the detected data input changes from the data input text.

In step 220, alternative input suggestions are ranked. The alternative input suggestions are associated with the detected data input changes transmitted to the user interface for analysis. In step 224, editing data and code are generated in response to an editor engine interacting with a hardware controller. In step 228, the editing data and code are executed thereby updating and modifying functions associated with the readability engine, a context score engine, and a ranking engine for increasing an efficiency of future recommendations associated with future data input text analysis.

In step 232, aspects of the data input text that are difficult to understand with respect to the data input text. Likewise, suggestions for improving a readability of the data input text are provided for a user. In step 234, the readability of the data input text is increased by targeting specific aspects of the data input text contributing to a difficulty of understanding measured by established readability metrics, semantic attributes, and syntactic attributes based on analysis with respect to semantic databases and NLP code execution. Additionally, recommendations associated with increasing readability are generated by adjusting to user activity to provide increasingly relevant suggestions; and enabling users to specify lists of domain-specific words and phrases to be excluded from a recommendation engine. In step 238, self-learning software code is generated. The self-learning software code is for executing future processes associated with executing a machine learning domain-specific linguistic data and memory reorganization method. The self-learning software code is stored within a modified portion of a memory structure of the hardware controller.

Figure 3:
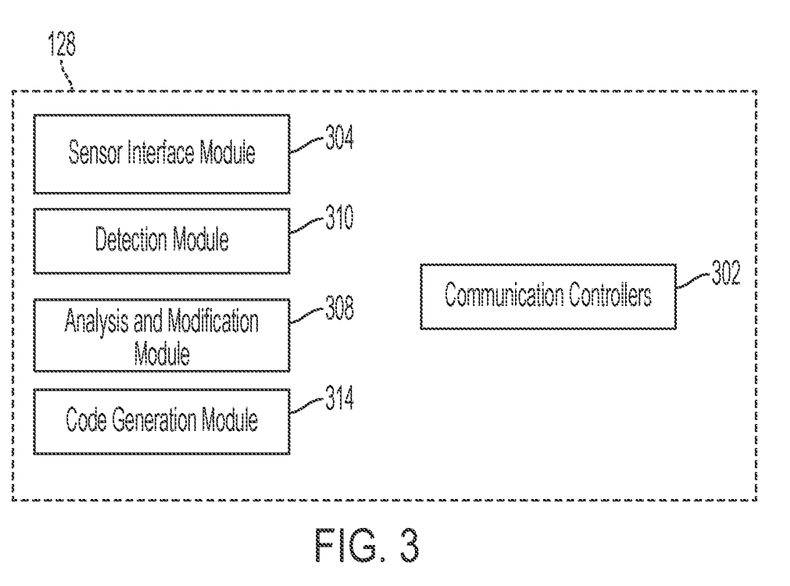
FIG. 3 illustrates an internal structural view of the self-learning software/hardware code/engines of FIG. 1, in accordance with embodiments of the present invention.

FIG. 3 illustrates an internal structural view of self-learning software/hardware code engines 28 of FIG. 1, in accordance with embodiments of the present invention. Self-learning software/hardware structure 121 includes a sensor interface module 304, a detection module 310, an analysis and modification module 308, a code generation module 314, and communication controllers 302. Sensor interface module 304 comprises specialized hardware and software for controlling all functions related to sensors/circuitry/logic 12 of FIG. 1. Detection module 310 comprises specialized hardware and software for controlling all functionality related to implementing the process described with respect to the algorithm of FIG. 2. Analysis and modification module 308 comprises specialized hardware and software for controlling all functions related to the analysis and modification steps of FIG. 2. Code generation module 314 comprises specialized hardware and software for controlling all functions related to generating all code and machine learning feedback for generating self-learning software code for executing future processes associated with executing the user interface modification method of the algorithm of FIG. 2. Communication controllers 302 are enabled for controlling all communications between sensor interface module 304, detection module 310, analysis and modification module 308, and code generation module 314.

Figure 4:
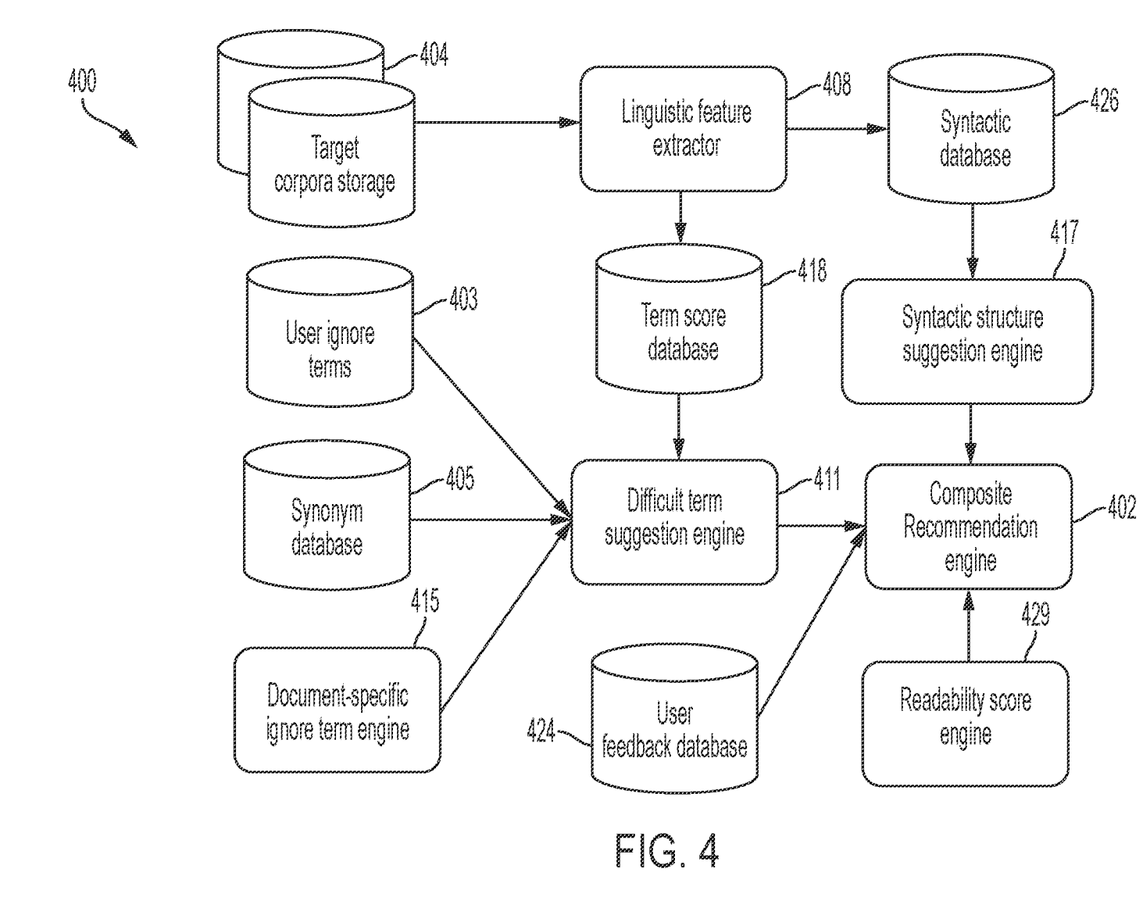
FIG. 4 illustrates a detailed view of a readability engine associated with improving interface technology, in accordance with embodiments of the present invention.

FIG. 4 illustrates a detailed view of a readability engine 400 associated with improving interface technology, in accordance with embodiments of the present invention. Readability engine 400 comprises a composite recommendation engine 402, a memory structure 404 required for the target corpora, a synonym database 405, a domain-specific term memory structure 403, a document specific term engine 415, linguistic feature extractor software 408, a term score database 418, a difficult terms suggestion engine 411, a user feedback database 424, a syntactic database 426, a syntactic engine 417, and a readability score engine 429. Readability engine 400 enables any domain specific terms provided by the user to be excluded from difficult terms suggestion engine 411 for generation of suggestions to improve a text readability. Readability engine 400 comprises hardware and software processing modules for implementing corpora machine learning techniques (feature extraction), learning domain-specific terms, and calculating readability metrics. Likewise, readability engine 400 comprises and hardware software engines for generating recommendations for difficult terms and syntax. Linguistic feature extractor 408 is configured to process all input documents to retrieve features such speech, term frequencies, document frequencies, average term and sentence length, etc. Features retrieved form linguistic feature extractor 408 are executed via a synonym ranking engine to rank alternative synonyms (distinguished by part of speech) based on a frequency across documents within a corpora. Each synonym is assigned a separate score for each corpus provided. The scores, input from a feedback engine, and readability scores (of the text) are combined within composite recommendation engine 402 to create a composite predictive score indicating the likelihood of a user choosing an associated synonym in the text. The composite scores are used by difficult terms suggestion engine 411 to provide suggestions for replacing terms within the user interface.

Syntactic structure suggestion engine 417 utilizes rule-based code to identify problems in grammar and syntax using established NLP methods (e.g., part of speech tagging, identification of noun and verb phrases, identification of passive voice, etc.). The rule-based code may be configured to identify features included within readability metrics (e.g., sentence length) and features not included within readability metrics (e.g., overuse of prepositional phrases). Associated recommendations are assigned a predictive score indicating the likelihood of user acceptance based on user activity and resultant readability scores within composite recommendation engine 402.

Document-specific ignore term engine 415 uses NLP code/techniques (e.g., term-frequency inverse document-frequency (TF-IDF) scores) to determine which terms are of singular importance to a specific document. The terms in combination with terms stored within a domain-specific terms database, are removed from the difficult terms suggestion engine 411. Terms within a domain-specific terms database are ignored within all documents and terms identified by document-specific terms engine 415 are ignored within respective documents. For example, a corpus of documents may consist of documents for many audiences. If a particular document is geared for a technical audience, it may use certain technical terms with greater frequency than documents geared to a general audience. Readability engine 400 is configured to remove the technical terms based on the assumption that the technical audience understands the terms and does not need to have them replaced via simpler alternatives. Likewise, if a same technical term appears in a document intended for a general audience a replacement term may be suggested.

A machine learning feedback engine analyzes user activity and provides input to allow suggestions from readability engine 400 to adapt and reflect user behavior. The feedback is used for analyzing differences between original text and modified text after a user receives suggestions from readability engine 400. The differences are used to determine whether each suggestion was accepted (i.e., the user addressed the issue identified) or ignored (i.e., the issue remains despite being identified by readability engine 400 as a problem). These designations (accepted or ignored) form part of the composite predictive scores mentioned above in the difficult terms engine 411 and syntactic structure recommendation engine 417.

The designations are used to improve future suggestions. For example, with respect to a case of a difficult term suggestion: readability engine 400 may identify a term "justification" in the original text and suggest its replacement by one of "grounds", "reason", "basis", "pretext", or "rationale" (presented in order). If a user replaced the term "justification" with the term "reason", then a score is provided (based on this usage and/or the usage of other terms replaced by the user) to a synonym ranking engine to give the term "reason" a higher composite score as described above. Over time, if users consistently choose the term "reason" as a replacement, it will move up in ranking, thereby allowing users to more easily select this term as a replacement. Conversely, if a user ignores this suggestion (leaving the term "justification" in the modified sentence) then the feedback engine will assign a positive score to the term "justification" as a potential synonym for "justification". Over time, if users consistently ignore the suggestion to replace the term "justification", then the engine will stop flagging this term and there will be no future suggestions to replace the term "justification", based on its composite score and its ranking. Furthermore, an impact to the overall readability of the document based on the proposed replacements are used in the composite predictive scoring process. The use of the feedback engine may be siloed to different classes of documents to further improve domain-specific suggestions, thereby providing separate feedback input scores for different classes of documents such that feedback from a general-audience based document are not used to influence suggestions in a technical-audience document.

Figure 5:
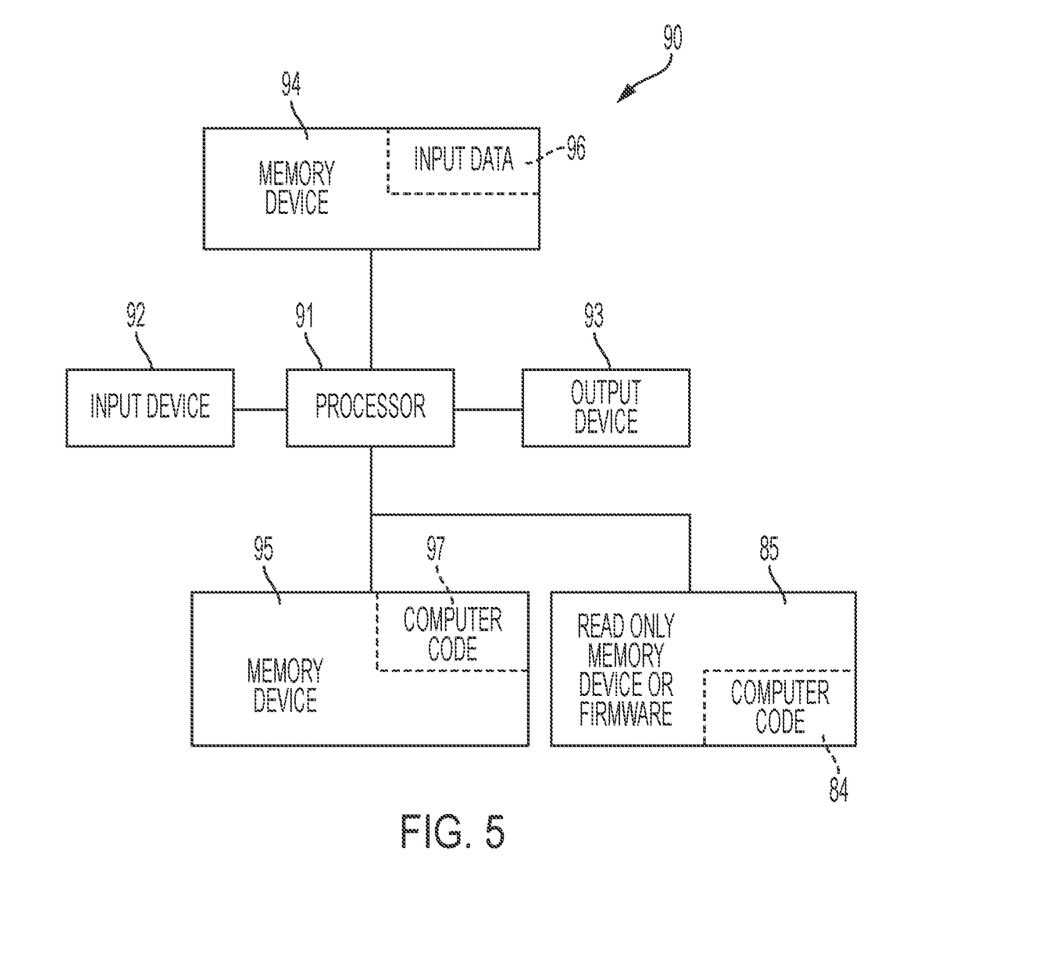
FIG. 5 illustrates a computer system used by the system of FIG. 1 for improving user interface technology associated with editing and modifying a specialized user interface and executing editing code for updating and modifying functions associated with software engines for increasing an efficiency of future recommendations associated with future data input text analysis processes, in accordance with embodiments of the present invention.

FIG. 5 illustrates a computer system 90 (e.g., hardware controller 14, database systems 25, and user interface 29 of FIG. 1) used by or comprised by the system 100 of FIG. 1 for improving user interface technology associated with editing and modifying a specialized user interface and executing editing code for updating and modifying functions associated with software engines for increasing an efficiency of future recommendations associated with future data input text analysis processes, in accordance with embodiments of the present invention.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, spark, R language, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 5 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for improving user interface technology associated with editing and modifying a specialized user interface and executing editing code for updating and modifying functions associated with software engines for increasing an efficiency of future recommendations associated with future data input text analysis processes. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include algorithms (e.g., the algorithm of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve user interface technology associated with editing and modifying a specialized user interface and executing editing code for updating and modifying functions associated with software engines for increasing an efficiency of future recommendations associated with future data input text analysis processes. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving user interface technology associated with editing and modifying a specialized user interface and executing editing code for updating and modifying functions associated with software engines for increasing an efficiency of future recommendations associated with future data input text analysis processes. In another embodiment, the invention provides a business method that performs the process steps of the invention on a subscription, advertising, and/or fee basis. That is, a service supplier, such as a Solution Integrator, could offer to enable a process for improving user interface technology associated with editing and modifying a specialized user interface and executing editing code for updating and modifying functions associated with software engines for increasing an efficiency of future recommendations associated with future data input text analysis processes. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
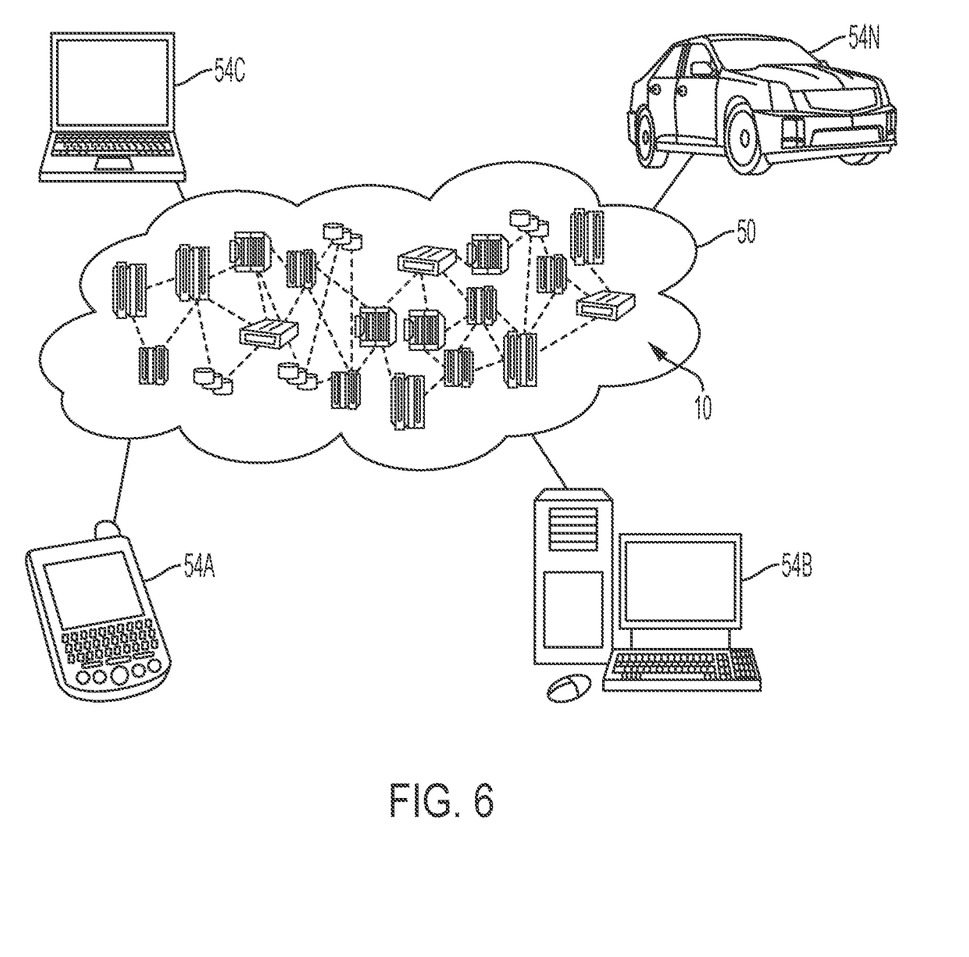
FIG. 6 illustrates a cloud computing environment, in accordance with embodiments of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 6 are intended to be illustrative only and that computing nodes 10 and cloud computing environment 50 can communicate with any type of computerized device over any type of network and/or network addressable connection (e.g., using a web browser).

Figure 7:
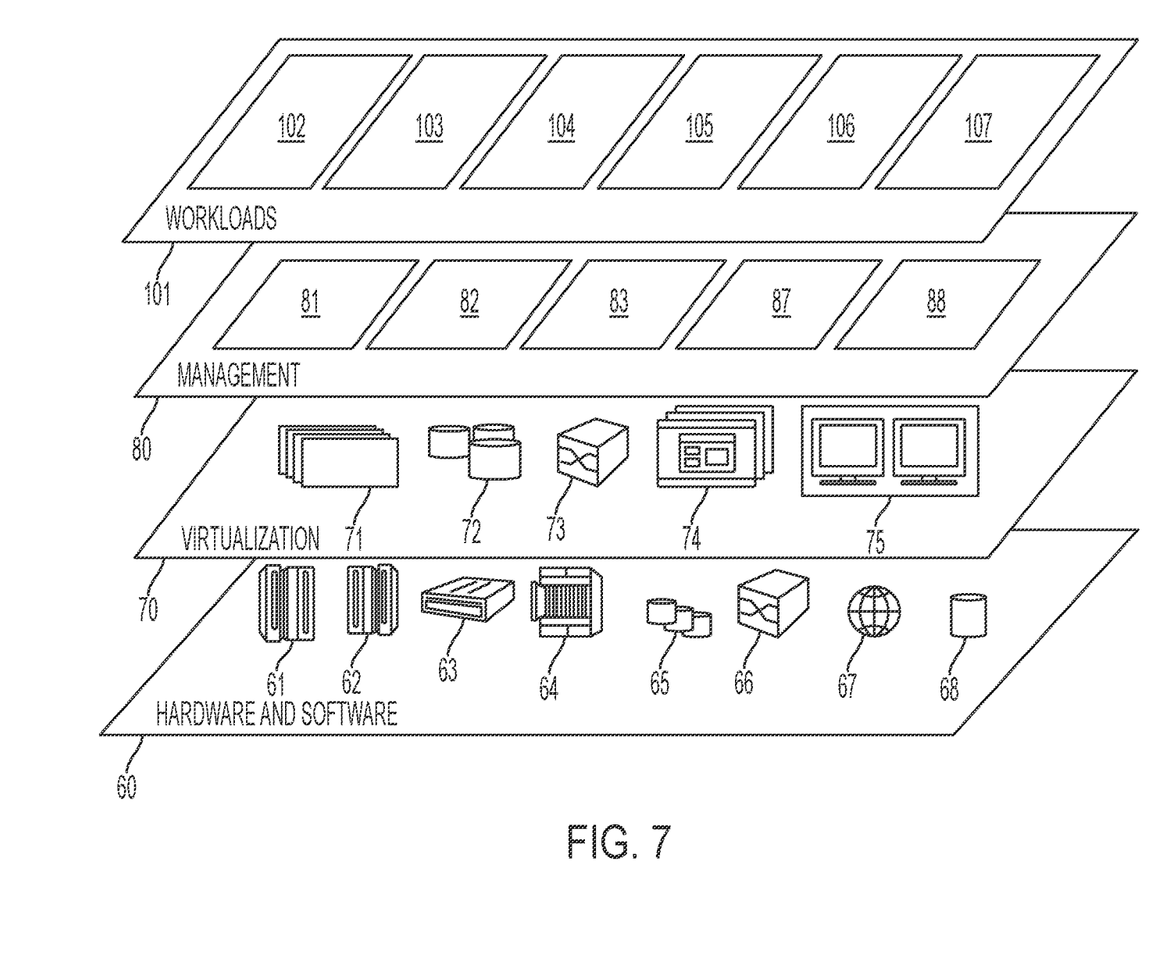
FIG. 7 illustrates a set of functional abstraction layers provided by cloud computing environment, in accordance with embodiments of the present invention.

Referring now to FIG. 7, a set of functional abstraction layers provided by cloud computing environment 50 (see FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 87 provides cloud computing resource allocation and management such that required service levels are met. Service Level Agreement (SLA) planning and fulfillment 88 provide pre-arrangement for, and procurement of, cloud computing resources for which a future requirement is anticipated in accordance with an SLA.

Workloads layer 101 provides examples of functionality for which the cloud computing environment may be utilized. Examples of workloads and functions which may be provided from this layer include: mapping and navigation 102; software development and lifecycle management 103; virtual classroom education delivery 104; data analytics processing 105; transaction processing 106; and for improving user interface technology associated with editing and modifying a specialized user interface and executing editing code for updating and modifying functions associated with software engines for increasing an efficiency of future recommendations associated with future data input text analysis processes 108.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A machine learning domain-specific linguistic data and memory reorganization method comprising:
   receiving, by a user interface via a processor of a hardware controller, data input text from a user;
   identifying, by said processor executing a readability engine of the hardware controller, words, phrases, and sentences within said data input text, wherein said words, phrases, and sentences are associated with linguistic attributes not included within common readability metrics;
   editing, by said processor via said user interface, said data input text based on user input;
   detecting in response to said editing, by said processor executing a machine learning engine of said hardware controller, improvements in said data input text;
   generating, by said processor in response to said detecting, a modified version of said user interface such that said modified version of said user interface is configured to allow additional users to view and modify additional data input text, view suggestions from said readability engine, and input domain-specific terms to a database;
   modifying, by said processor, said suggestions of said readability engine;
   reconstructing, by said processor based on results of said modifying, user actions and activity with respect to accepted user suggestions of said user actions and activity;
   determining, by said processor executing a context score engine of the hardware controller with respect to said reconstructing, change attributes associated with said data input text with respect to said modified version of said user interface and detected data input changes from said data input text;
   detecting, by said processor, linguistic issues associated with said data input text;
   increasing, by said processor based on said change attributes and said linguistic issues, a readability of said data input text via executed code targeting specific aspects of associated text contributing to a difficulty of understanding detected via specialized sensors;
   ranking, by said processor executing a ranking engine of said hardware controller, alternative input suggestions associated with said detected data input changes transmitted to said user interface for analysis;
   normalizing, by said processor, variables associated with said alternative input suggestions;
   generating, by said processor, editing data and code in response to an editor engine interacting with said hardware controller; and
   executing, by said processor with respect to said variables, said editing data and code thereby updating and modifying functions associated with said readability engine, said context score engine, and said ranking engine for increasing an efficiency of future recommendations associated with future data input text analysis and adjusting associated software and hardware with respect to domain specific needs with respect to said hardware controller, wherein said future recommendations are associated with simplifying features within software code of said associated software and hardware and associating differing readability requirements with differing entities within an organization.

2. The method of claim 1, wherein said identifying comprises:
   executing machine learning code and existing grammatical rule-based code, with respect to semantic attributes and syntactic attributes, for learning a frequency of words of said data input text within a target corpora; and
   identifying average word and sentence length within said target corpora, with respect to a syllable count and word count, for executing suggestions with respect to said data input text.

3. The method of claim 1, wherein said determining said change attributes comprises:
   executing NLP code for measuring similarity attributes of words and phrases of said data input text with respect to data of a semantic database; and
   generating, based on results of said executing, a composite score associated with said detected data input changes from said data input text.

4. The method of claim 1, wherein said determining said change attributes comprises:
   executing word embedding code for computing similarity attributes of words and phrases of said data input text with respect to vector similarity metrics; and
   generating, based on results of said executing, a composite score associated with said detected data input changes from said data input text.

5. The method of claim 1, wherein said domain-specific terms are leveraged as variables such that said user is provided with visual graphical indications to identify words and phrases to be excluded from said user interface, and wherein said hardware controller is configured to generate self learning software code associated with user activity with respect to said user interface for generating relevant and accurate suggestions for said generating said self learning software code.

6. The method of claim 1, further comprising:
   identifying, by said processor executing a cognitive engine of said hardware controller, aspects of said data input text that are difficult to understand with respect to said data input text;
   providing, by said processor executing said cognitive engine, suggestions for improving a readability of said data input text.

7. The method of claim 6, further comprising:
   increasing, by said processor, said readability of said data input text by targeting specific aspects of said data input text contributing to a difficulty of understanding measured by established readability metrics, semantic attributes, and syntactic attributes based on analysis with respect to semantic databases and NLP code execution.

8. The method of claim 7, further comprising:
   generating, by said processor executing a recommendation engine, recommendations associated with said increasing said readability by adjusting to user activity to provide increasingly relevant suggestions; and
   enabling users to specify lists of domain-specific words and phrases to be excluded from said recommendation engine.

9. The method of claim 1, further comprising:
   generating, by said processor, self learning software code for executing future processes associated with executing said machine learning domain-specific linguistic data and memory reorganization method; and storing, by said processor, said self learning software code within a modified portion of a memory structure of said hardware controller.

10. The method of claim 1, further comprising:
providing at least one support service for at least one of creating, integrating, hosting, maintaining, and deploying computer-readable code in the control hardware, said code being executed by the computer processor to implement: said receiving, said identifying, said editing, said detecting, said generating said modified version of said user interface, said determining, said ranking, said generating said editing data, and said executing.

11. A computer program product, comprising a computer readable hardware storage device storing a computer readable program code, said computer readable program code comprising an algorithm that when executed by a processor of a hardware controller implements a machine learning domain-specific linguistic data and memory reorganization method, said method comprising:
receiving, by a user interface via said processor, data input text from a user;
identifying, by said processor executing a readability engine of the hardware controller, words, phrases, and sentences within said data input text, wherein said words, phrases, and sentences are associated with linguistic attributes not included within common readability metrics;
editing, by said processor via said user interface, said data input text based on user input;
detecting in response to said editing, by said processor executing a machine learning engine of said hardware controller, improvements in said data input text;
generating, by said processor in response to said detecting, a modified version of said user interface such that said modified version of said user interface is configured to allow additional users to view and modify additional data input text, view suggestions from said readability engine, and input domain-specific terms to a database;
modifying, by said processor, said suggestions of said readability engine;
reconstructing, by said processor based on results of said modifying, user actions and activity with respect to accepted user suggestions of said user actions and activity;
determining, by said processor executing a context score engine of the hardware controller with respect to said reconstructing, change attributes associated with said data input text with respect to said modified version of said user interface and detected data input changes from said data input text;
detecting, by said processor, linguistic issues associated with said data input text;
increasing, by said processor based on said change attributes and said linguistic issues, a readability of said data input text via executed code targeting specific aspects of associated text contributing to a difficulty of understanding detected via specialized sensors;
ranking, by said processor executing a ranking engine of said hardware controller, alternative input suggestions associated with said detected data input changes transmitted to said user interface for analysis;
normalizing, by said processor, variables associated with said alternative input suggestions;
generating, by said processor, editing data and code in response to an editor engine interacting with said hardware controller; and
executing, by said processor with respect to said variables, said editing data and code thereby updating and modifying functions associated with said readability engine, said context score engine, and said ranking engine for increasing an efficiency of future recommendations associated with future data input text analysis and adjusting associated software and hardware with respect to domain specific needs with respect to said hardware controller, wherein said future recommendations are associated with simplifying features within software code of said associated software and hardware and associating differing readability requirements with differing entities within an organization.

12. The computer program product of claim 11, wherein said identifying comprises:
executing machine learning code and existing grammatical rule-based code, with respect to semantic attributes and syntactic attributes, for learning a frequency of words of said data input text within a target corpora; and
identifying average word and sentence length within said target corpora, with respect to a syllable count and word count, for executing suggestions with respect to said data input text.

13. The computer program product of claim 11, wherein said determining said change attributes comprises:
executing NLP code for measuring similarity attributes of words and phrases of said data input text with respect to data of a semantic database; and
generating, based on results of said executing, a composite score associated with said detected data input changes from said data input text.

14. The computer program product of claim 11, wherein said determining said change attributes comprises:
executing word embedding code for computing similarity attributes of words and phrases of said data input text with respect to vector similarity metrics; and
generating, based on results of said executing, a composite score associated with said detected data input changes from said data input text.

15. The computer program product of claim 11, wherein said domain-specific terms are leveraged as variables such that said user is provided with visual graphical indications to identify words and phrases to be excluded from said user interface, and wherein said hardware controller is configured to generate self software learning code associated with user activity with respect to said user interface for generating relevant and accurate suggestions for said generating said self learning software code.

16. The computer program product of claim 11, wherein said method further comprises:
identifying, by said processor executing a cognitive engine of said hardware controller, aspects of said data input text that are difficult to understand with respect to said data input text;
providing, by said processor executing said cognitive engine, suggestions for improving a readability of said data input text.

17. The computer program product of claim 16, wherein said method further comprises:
increasing, by said processor, said readability of said data input text by targeting specific aspects of said data input text contributing to a difficulty of understanding measured by established readability metrics, semantic attributes, and syntactic attributes based on analysis with respect to semantic databases and NLP code execution.

18. The computer program product of claim 17, wherein said method further comprises:
generating, by said processor executing a recommendation engine, recommendations associated with said increasing said readability by adjusting to user activity to provide increasingly relevant suggestions; and enabling users to specify lists of domain-specific words and phrases to be excluded from said recommendation engine.

19. The computer program product of claim 11, wherein said method further comprises:
generating, by said processor, self learning software code for executing future processes associated with executing said machine learning domain-specific linguistic data and memory reorganization method; and
storing, by said processor, said self learning software code within a modified portion of a memory structure of said hardware controller.

20. A hardware controller comprising a processor coupled to a computer-readable memory unit, said memory unit comprising instructions that when executed by the computer processor implements a machine learning domain-specific linguistic data and memory reorganization method comprising:
receiving, by a user interface via said processor, data input text from a user;
identifying, by said processor executing a readability engine of the hardware controller, words, phrases, and sentences within said data input text, wherein said words, phrases, and sentences are associated with linguistic attributes not included within common readability metrics;
editing, by said processor via said user interface, said data input text based on user input;
detecting in response to said editing, by said processor executing a machine learning engine of said hardware controller, improvements in said data input text;
generating, by said processor in response to said detecting, a modified version of said user interface such that said modified version of said user interface is configured to allow additional users to view and modify additional data input text, view suggestions from said readability engine, and input domain-specific terms to a database;
modifying, by said processor, said suggestions of said readability engine;
reconstructing, by said processor based on results of said modifying, user actions and activity with respect to accepted user suggestions of said user actions and activity;
determining, by said processor executing a context score engine of the hardware controller with respect to said reconstructing, change attributes associated with said data input text with respect to said modified version of said user interface and detected data input changes from said data input text;
detecting, by said processor, linguistic issues associated with said data input text;
increasing, by said processor based on said change attributes and said linguistic issues, a readability of said data input text via executed code targeting specific aspects of associated text contributing to a difficulty of understanding detected via specialized sensors;
ranking, by said processor executing a ranking engine of said hardware controller, alternative input suggestions associated with said detected data input changes transmitted to said user interface for analysis;
normalizing, by said processor, variables associated with said alternative input suggestions;
generating, by said processor, editing data and code in response to an editor engine interacting with said hardware controller; and
executing, by said processor with respect to said variables, said editing data and code thereby updating and modifying functions associated with said readability engine, said context score engine, and said ranking engine for increasing an efficiency of future recommendations associated with future data input text analysis and adjusting associated software and hardware with respect to domain specific needs with respect to said hardware controller, wherein said future recommendations are associated with simplifying features within software code of said associated software and hardware and associating differing readability requirements with differing entities within an organization.

* * * * *